United States Patent [19]

Hume

[11] 4,391,291

[45] Jul. 5, 1983

[54] APPARATUS FOR RECONSTITUTING A CONCENTRATE

[76] Inventor: Ronald W. Hume, 848 Harbor Island, Clearwater, Fla. 33515

[21] Appl. No.: 237,757

[22] Filed: Feb. 24, 1981

[51] Int. Cl.³ .............................................. F16K 19/00
[52] U.S. Cl. ...................................... 137/99; 92/13.3; 92/13.7; 417/399
[58] Field of Search ................. 137/99; 92/13.3, 13.7, 92/62; 417/399

[56] References Cited

U.S. PATENT DOCUMENTS

| | | | |
|---|---|---|---|
| 2,771,846 | 11/1956 | Horton | 92/13.7 X |
| 2,887,094 | 5/1959 | Krukemeier | 137/99 X |
| 3,815,621 | 6/1974 | Robinson | 137/99 |
| 4,004,602 | 1/1977 | Cordis | 137/99 |

Primary Examiner—Robert G. Nilson
Attorney, Agent, or Firm—Ronald E. Smith

[57] ABSTRACT

An apparatus of the prime mover type for reconstituting a liquid concentrate. Water under pressure, supplied by a municipal system, alternately flows into and out of opposite ends of a first cylinder in which a double-acting piston is slideably mounted, thereby reciprocating the same. From the first cylinder, the water flows to a collection hopper where it is mixed with a concentrate requiring reconstitution.

The concentrate is pumped to the collection hopper by a single-acting piston means, disposed in a second cylinder, that is mechanically connected to the double-acting piston. The displacement volumes of the first and second cylinders are the same so that each cycle of the double acting piston pumps two parts of water into the collection hopper for every one part of concentrate pumped thereinto by the single-acting piston.

The mechanical connection between the double and single acting pistons comprises a yoke means that is specifically structured to introduce play into such mechanical connection so that greater ratios of water to concentrate may be pumped into the collection hopper.

8 Claims, 1 Drawing Figure

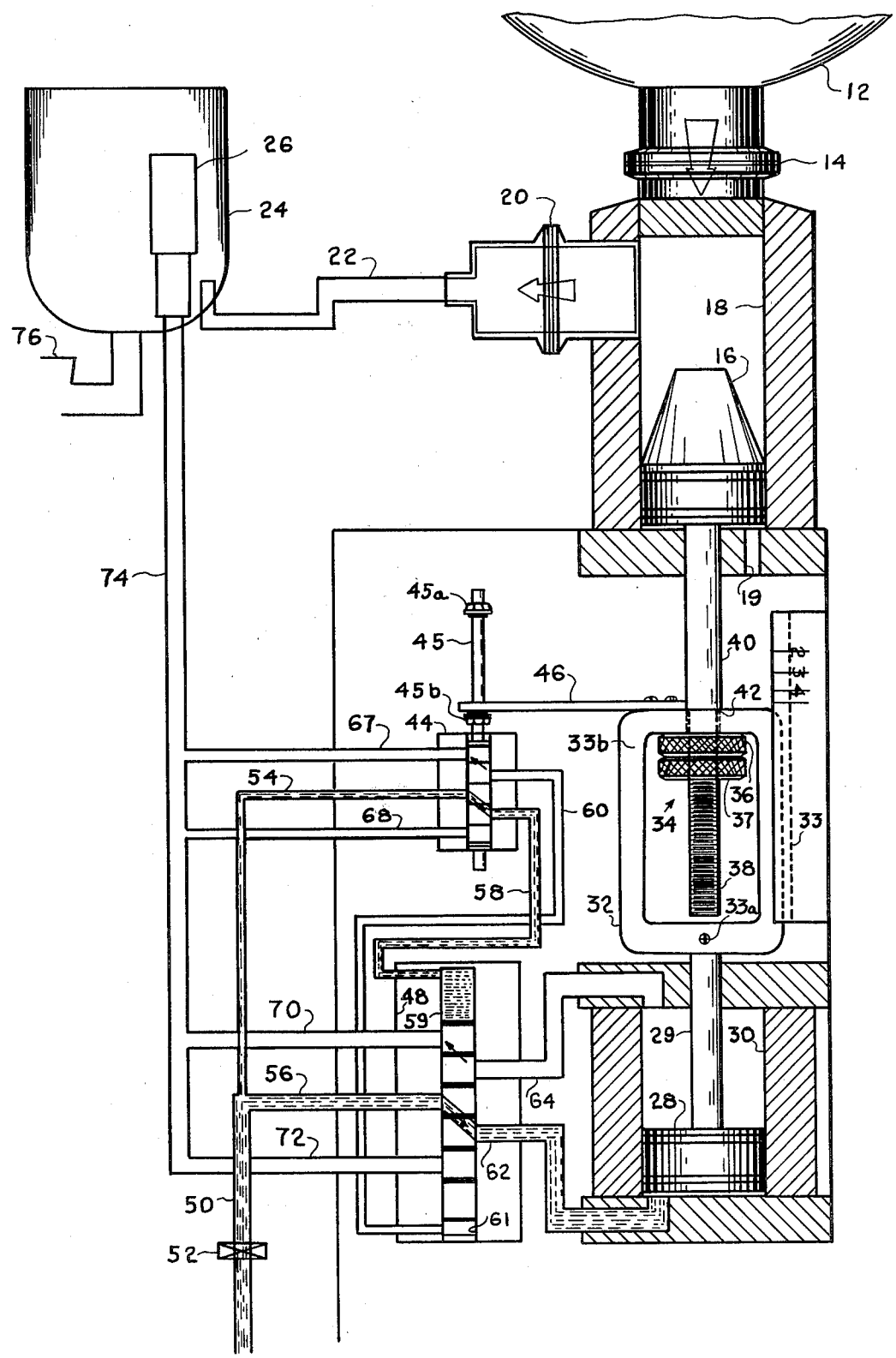

APPARATUS FOR RECONSTITUTING A CONCENTRATE

BACKGROUND OF THE INVENTION

1. Field of the Invention

This invention relates generally to blending machines of the type designed to reconstitute a concentrate by diluting the same, and more particularly relates to such a machine wherein the force of the flow of the reconstituting liquid drives the apparatus.

2. Description of the Prior Art

Machines for blending a concentrate and a liquid, such as water, are ubiquitous. However, the known machines incorporate extensive electronic circuitry to accomplish the desired result. Typically, timing circuits are provided to start and stop universal motors that are connected in driving relation to concentrate and reconstituting liquid pumps. Accordingly, the concentrate and liquid are mixed in varying proportions as determined by the length of time their respective pumps are operating.

SUMMARY OF THE INVENTION

A longstanding but heretofore unfulfilled need exists for a concentrate-diluting machine that harnesses the pressure of a city or county water system to drive its constituent parts and which utilizes such water as the diluting medium after its energy has been spent.

The inventive apparatus fulfills this need by providing a first hopper means for transiently retaining a concentrate, a second hopper means for transiently retaining a mixture of said concentrate and a reconstituting liquid such as water, a motor means for pumping the reconstituting liquid to the second hopper means and for driving a concentrate pumping means that pumps the concentrate from the first hopper means to the second, said motor means connected in driven relation to a source of the reconstituting liquid that delivers such liquid to such motor means under sufficient pressure to operate the same, and connected in driving relation to said concentrate pumping means through a variable-play yoking means, and by incorporating a pair of two-way, multi-port valves that direct liquid flow through the apparatus, one of said valves being mechanically coupled to said yoking means, and operative to drive the other of said valves.

A float element in the collection hopper de-activates and activates the apparatus responsive to the attaining of predetermined upper and lower threshholds of reconstituted liquid level in the collection hopper, respectively.

It is therefore seen to be an important object of this invention to provide an apparatus for reconstituting a concentrate that derives its motive force from the source of the liquid used to reconstitute the concentrate.

Another object is to provide such an apparatus characterized by an absence of electrical, electronic and electro-mechanical parts.

Still another object is to provide such an apparatus having means for providing a reconstituting liquid to concentrate ratio of 2:1 or higher liquid to concentrate ratios.

Yet another object is to provide such an apparatus that is self-activating and self-de-activating responsive to the load placed on the apparatus by the consumer or other source of demand on the apparatus.

The invention accordingly comprises the features of construction, combination of elements, and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description taken in connection with the accompanying drawings, in which:

FIG. 1 is a diagrammatic representation of the preferred embodiment of the invention.

DETAILED DESCRIPTION OF THE PREFERRED EMBODIMENT

Referring now to the drawings, it will be seen that the inventive apparatus is designated 10 as a whole. The elements that collectively form the apparatus are the concentrate hopper or reservoir 12, a first one way valve 14 disposed downwardly thereof in the discharge portion of the hopper 12, a frusto-conical-in-configuration piston means 16 slideably mounted in a complementally-formed first cylinder 18 having a vent hole 19, a second one way valve 20 disposed in a conduit means 22 that provides fluid communication between said first cylinder 18 and a reconstituted liquid-containing second hopper or reservoir 24, a float valve 26 operatively mounted in said reservoir 24, a second piston or motor means 28, its piston rod 29, a motor cylinder 30, a yoking means 32 for interconnecting the aforesaid piston means 16 and 28, a track means 33 within which said yoking means 32 is linearly reciprocable, a connecting means 33a for rigidly connecting the yoking means 32 and the piston rod 29, a play-introducing assembly generally designated 34, a first multi-port valve 44, a piston 28-stroke setting stem 45, a coupling member 46 for rigidly coupling the first valve 44 and the yoking means 32, a second multi-port valve 48, an inlet water line or supply line 50, a flow-regulating valve 52, inlet branch lines 54, 56, valve outlet lines 58, 60, 62 and 64, variable size cavities 59, 61 disposed at the ends, respectively, of the outlet lines 58, 60, discharge feeder lines 66, 68, 70 and 72, main discharge line 74 and a demand line 76.

The operation of the apparatus will now be described. The bidirectional multi-port valves 44 and 48 are known commercially as Retrak (Trademark) two (2) way, five port valves, and are generally utilized for automatic cycling of air cylinders. Inspection of FIG. 1 indicates that both of the valves 44, 48 are provided with six axially spaced water tight gaskets, thereby defining a plurality of five chambers or ports therebetween. A plurality of axially spaced groupings of parallel, circumferentially spaced, longitudinally aligned openings (not shown) are formed in the cylindrical sidewall of the valve body of each valve 44, 48 such that the gasket members substantially bisect an associated group of openings. In this manner, fluid flows substantially unrestricted under preselected gaskets (i.e., from one port or chamber to another) when the valve 44 or 48 is in one of its extreme longitudinally displaced positions, and the fluid flow begins to cut off as the valve body 44 or 48 approaches its mid-way position, and cuts off completely when the valve body 44 or 48 is mid-way between its extreme positions, as will be apparent from a study of FIG. 1.

In FIG. 1, both the driving and the driven pistons, 28 and 16 respectively, are shown in their BDC positions.

Accordingly, cylinder 18 is full of concentrate and cylinder 30 is full of water.

It should be observed that the driven piston 16 is carried by an elongate piston rod 40 that has an annular shoulder or shelf portion 42 formed therein to provide a reduced diameter portion 38, which reduced diameter portion 38 is threaded as indicated in FIG. 1 for engaging knurled nuts 36, 37. The yoke element 32 is a continuous, rigid loop member having a clearance aperture shown in phantom lines for receiving only the reduced diameter portion 38 of the piston rod 40. (The outermost phantom lines in FIG. 1 indicate the clearance aperture and the innermost phantom lines in FIG. 1 indicate the reduced diameter portion 38). In FIG. 1, the nuts 36 and 37 are shown fully advanced. Thus, a portion 33b of the yoke element 32 is held in tightly sandwiched relation between the annular shoulder 42 and the leading face of nut 36, the leading face of portion 33b abutting said shoulder 42 and the trailing face of portion 33b abutting said leading face of nut 36. Since displacement of the driving, or motor piston 28 is rigidly communicated to the rigid yoke element 32 via connection pin means 33a, travel of the driving piston 28 from BDC to TDC will effect a simultaneous and corresponding travel of the driven piston 16 from BDC to TDC, irrespective of the position of the nuts 36 and 37, due to the abutting relationship between the yoke element 32 and the shoulder 42. However, travel of the driving piston from TDC to BDC effects a simultaneous and corresponding travel of the driven piston from TDC to BDC only when nuts 36 and 37 are fully advanced as shown in FIG. 1. Retraction of the nuts 36, 37 from the position as shown in FIG. 1 introduces play into the yoking assembly, generally designated 34, because travel of the driving piston 28 from TDC to BDC will effect a simultaneous and corresponding travel of the yoke element 32, but since shoulder 42 and the leading edge of the yoke element's 32 portion 33b are merely in abutting relation, the leading edge of the yoke element portion 33b simply separates from and withdraws from the shoulder portion 42 attendant such TDC to BDC travel of piston 28, thereby leaving piston 16 in its TDC position. Only when the trailing face of portion 33b abuts the leading face of nut 36 will driven piston 16 be displaced from its TDC position to a retracted position, such retracted position approaching BDC but spaced therefrom as determined by the amount of retraction of the leading face of nut 36 from the trailing face of portion 33b. Indeed, full retraction of nuts 36 and 37 would effectively disconnect the driving and the driven pistons 28 and 16, in that the trailing face of portion 33b would not abut the leading face of nut 36 until the driving piston 28 had already reached BDC. Thus, driven piston 16 would remain in its TDC position throughout each cycle of the driving piston 28. In such a mode, only water or other reconstituting liquid would flow into the collection hopper 24, there being no flow of concentrate from hopper 12 to hopper 24 in such mode.

With the nuts 36, 37 fully advanced, as shown, two parts of water will be pumped to hopper 24 by the driving piston 28 for each one part of concentrate pump to hopper 24 by the driven piston 16, because the volumetric displacement of pistons 28 and 16 are equal, and piston 28 is double-acting whereas piston 16 is single-acting. Travel of the driven piston 16 from TDC toward BDC does no useful work and vent hole 19 is provided to allow such travel to be accomplished in the substantial absence of back pressure on the piston 16.

The slide member 33 which provides a track within which yoke element 32 reciprocates is graduated as indicated in FIG. 1 so that the operator of the apparatus can readily preselect the desired ratio of liquid to concentrate, from 2:1 to 6:1 or virtually infinity:1, or any ratio therebetween. The ratio is set when the driving and driven pistons 28 and 16 are in their TDC positions, and the trailing face of nut 36 and the leading face of lock nut 37 are brought into registration with the mark on the graduated scale which represents the desired ratio. Careful study of FIG. 1 will indicate that travel of pistons 16 and 28 from their respective BDC positions to their respective TDC positions will result in alignment of the 2:1 ratio mark on the graduated scale and the juxtaposition line of nuts 36 and 37.

The reciprocation of driving piston 28 is effected by the flow of water from supply line 50 into the opposing ends of motor cylinder 30 via valve 48 outlet lines 62 and 64, said flow alternating so that when water flows into the cylinder 30 through line 62, water flows out of the cylinder 30 through line 64. Such flow will begin when the pistons 16 and 28 are in their respective BDC positions, as shown in FIG. 1.

By-directional valve 48 is displaced into its position as shown in FIG. 1 by the filling of cavity 59 by water directed thereto by valve outlet line 58 of the bi-directional valve 44. Substantially simultaneously with the filling of cavity 59 with water or other reconstituting liquid, water exits the opposing cavity 61 via line 60 and flows to the collection hopper 24 via valve 44, discharge feeder line 66 and main discharge line 74.

It is apparent from a review of FIG. 1 that discharge feeder lines 68 and 72 of the first and second bi-directional valves 44 and 48, respectively, are effectively removed from the system when the pistons are in their BDC positions. However, when the pistons reach their TDC positions as a result of the above-described fluid flow, the mechanical coupling arm 46 that is rigidly secured to the yoke element 32, on the leading face of portion 33b thereof, as shown in FIG. 1, will axially displace stroke setting stem 45 in an upward direction as viewed on the plane of the paper in FIG. 1. Such axial displacement of stem 45 effects a simultaneous and corresponding displacement of the bi-directional valve 44 so that dormant discharge line 68 receives fluid flowing out of cavity 59 via line 58, line 54 enters into fluid communication with line 60 and hence water begins filling cavity 61, and line 66 becomes dormant until the cycle repeats. Entry of water into cavity 61 causes valve 48 to axially displace attendant expansion of cavity 61, so that dormant discharge line 72 receives water from cylinder 30 via valve 48 and line 62, line 64 receives water from line 56 and line 70 becomes dormant until the cycle repeats.

Thus it is seen that valve 48 displaces responsive to activation by valve 44, which valve 44 displaces responsive to activation by the coupling member 46.

Stroke setting stem 45 need not be threaded as shown, since with nut 45a spaced from nut 45b by a distance equal to the full length of the piston stroke of piston 28, less the maximum axial displacement distance of the valve 44, the proportion of liquid to concentrate is easily set in the above-described manner. However, by advancing nut 45a toward nut 45b, the length of the piston stroke of piston 28 can be shortened, although this complicates, somewhat, the determination as to where the nuts 36, 37 should be placed to provide the desired liquid to concentrate ratios.

Preferably, flow control valve 52 is provided so that the speed of the apparatus 10 can be slowed by throttling the flow of liquid from the external source. Such supply flow is cut off completely when float 26 reaches a predetermined upper limit and is re-established when the float 26 reaches a predetermined lower limit.

It will thus be seen that the objects set forth above, and those made apparent by the preceding description, are efficiently attained, and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Now that the invention has been described,
That which is claimed is:

1. An apparatus of the type designed to reconstitute a liquid concentrate, said apparatus including a first reservoir for storing the concentrate and a second reservoir for storing the reconstituted concentrate, and said apparatus further comprising, in combination,
   a pumping means operable to transfer predetermined amounts of concentrate from said first reservoir to said second reservoir,
   said pumping means including a first piston means carried by a first piston rod means,
   a motor means operable to deliver predetermined amounts of a reconstituting fluid to said second reservoir,
   said motor means including a second piston means carried by a second piston rod means,
   a yoking means for interconnecting said motor means in driving relation to said pumping means,
   said first and second piston rod means disposed in axial alignment with one another and operably interconnected to one another through said yoking means,
   a pair of multi-port, bi-directional valve means for operably interconnecting an external source of fluid under pressure in driving relation to said motor means,
   said pair of valve means operably interconnected to one another so that one of said pair is a driving valve and the other of said pair is a driven valve,
   said driving valve being operably interconnected to said yoking means so that the position of said yoking means determines the opening and closing of the ports of said driving valve,
   said first piston rod means having a reduced diameter portion to provide a shoulder means between the reduced and un-reduced portions of said first piston rod means,
   said yoking means provided with an aperture means for receiving only the reduced diameter portion of said first piston rod means so that travel of said first piston rod means in a first direction toward said yoking means displaces and yoking means by abutting a leading portion of said yoking means, but travel of said first piston rod means in a second direction away from said yoking means does not displace said yoking means.

2. The apparatus of claim 1, wherein the reduced diameter portion of said first piston rod means is threaded, and wherein a complementally threaded, axially adjustable nut means is carried thereon and is disposed to abut said yoking means at its trailing edge so that travel of said first piston rod means in said second direction away from said yoking means displaces said yoking means only when said nut means abuts said trailing edge of said yoking means, the axial positioning of said nut means thereby determining the amount of play between the respective movements of said first and second piston means.

3. The apparatus of claim 2, wherein said driving valve is mounted for axial reciprocation between a first and second position, said first position operative to open a first port therein which opening permits passage of said reconstituting fluid into a first conduit that interconnects said driving and driven valves, said second position operative to open a second port therein which opening permits passage of said reconstituting fluid into a second conduit that interconnects said driving and driven valves.

4. The apparatus of claim 3, wherein said driven valve is mounted for axial reciprocation between a first and second position, said reciprocation being effected by the alternating flow of said reconstituting fluid through said first and second conduits.

5. The apparatus of claim 4, wherein said motor means is a double acting piston means mounted for axial reciprocation in a cylinder means, wherein the first position of said driven valve opens a first port that admits said reconstituting fluid into a first end of said cylinder means, and wherein the second position of said driven valve opens a second port that admits said fluid into a second end of said cylinder means.

6. The apparatus of claim 5, wherein said driving valve has two outlet passages disposed in fluid communication with opposite ends of said driven valve, and two discharge passages disposed in fluid communication with said second reservoir means, said outlet and discharge passages accomodating reverse flows of reconstituting fluid attendant each reciprocation of said driving valve.

7. The apparatus of claim 6, wherein said driven valve has two outlet passages disposed in fluid communication with opposite ends of said motor means cylinder, and two discharge passages disposed in fluid communication with said second reservoir means, said outlet and discharge passages accomodating reverse flows of reconstituting fluid attendant each reciprocation of said driven valve.

8. The apparatus of claim 7, wherein said pumping means comprises an axially reciprocable piston means slideably mounted in a complementally formed cylinder means, said cylinder means separated from said first and second reservoirs by first and second one-way valves, respectively, so that retraction of said piston means creates a vacuum that pulls concentrate through said first one-way valve and into said cylinder and so that extension of said piston discharges said concentrate through said second one-way valve and into said second reservoir.

* * * * *